United States Patent
Hirata

(10) Patent No.: US 6,947,290 B2
(45) Date of Patent: Sep. 20, 2005

(54) SHIELDED CARD CONNECTOR WITH IMPROVED CONTACTS

(75) Inventor: Toshihisa Hirata, Yamato (JP)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 10/469,572

(22) PCT Filed: Mar. 22, 2002

(86) PCT No.: PCT/US02/09085

§ 371 (c)(1),
(2), (4) Date: Aug. 29, 2003

(87) PCT Pub. No.: WO02/077905

PCT Pub. Date: Oct. 3, 2002

(65) Prior Publication Data

US 2004/0114296 A1 Jun. 17, 2004

(51) Int. Cl.⁷ .................................................. H05K 1/14
(52) U.S. Cl. ........................ 361/741; 361/759; 439/155; 369/75.1
(58) Field of Search ................................ 361/679–687, 361/724–727, 729, 732, 740, 747, 754, 759; 439/153–155; 369/75.1

(56) References Cited

U.S. PATENT DOCUMENTS

| | | | |
|---|---|---|---|
| 5,889,649 A | * | 3/1999 | Nabetani et al. ............ 361/684 |
| 6,219,231 B1 | * | 4/2001 | Nabetani et al. ............ 361/684 |
| 6,587,348 B2 | * | 7/2003 | Kondo ........................ 361/741 |
| 6,643,125 B2 | * | 11/2003 | Nabetani et al. ............ 361/684 |

* cited by examiner

*Primary Examiner*—Hung Van Duong
(74) *Attorney, Agent, or Firm*—Charles S. Cohen

(57) ABSTRACT

A card connector is provided for receiving an integrated circuit card. The connector has a connector housing including a metal shell with a slot for receiving the card. A side wall of the shell defines at least a portion of the slot. A spring contact protrudes from the side wall into the slot for engaging an appropriate conductive portion of the integrated circuit card when inserted into the slot. The spring contact includes a proximal bent portion extending angularly from the side wall outwardly beyond the slot. A distal bent portion extends angularly from the proximal bent portion back into the slot for engaging the conductive portion of the inserted circuit card.

8 Claims, 4 Drawing Sheets

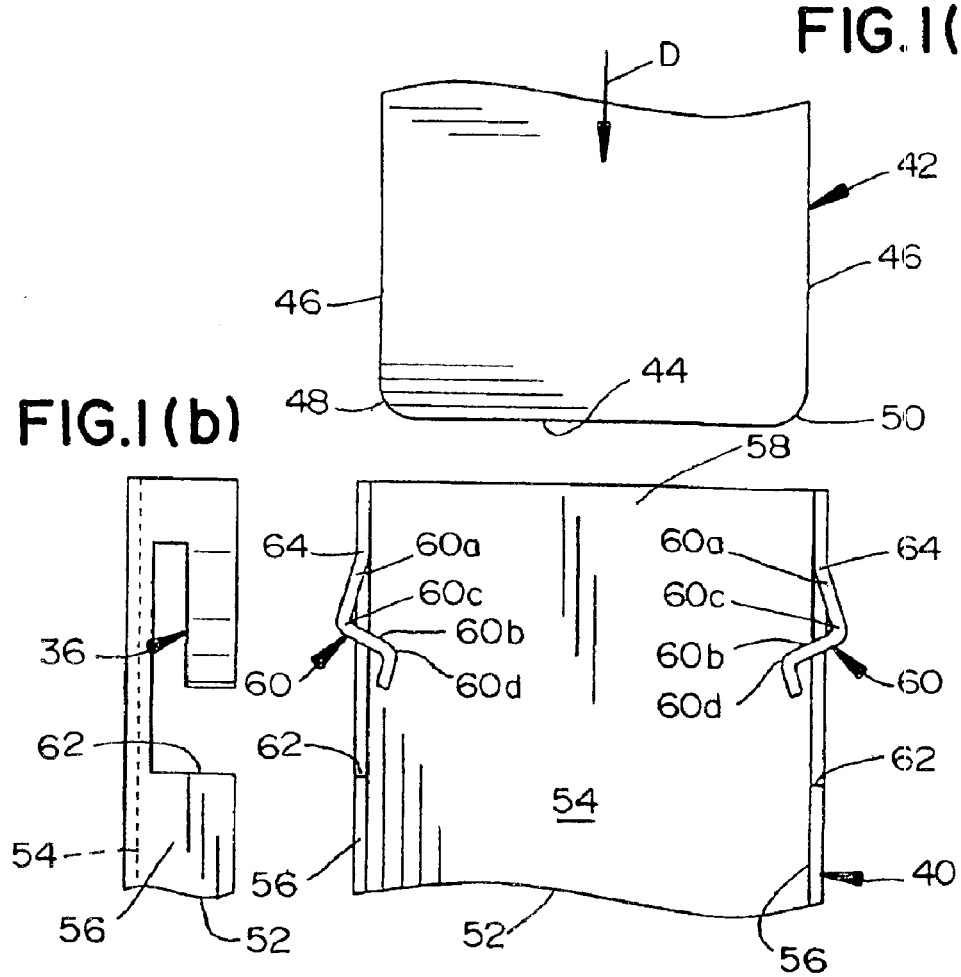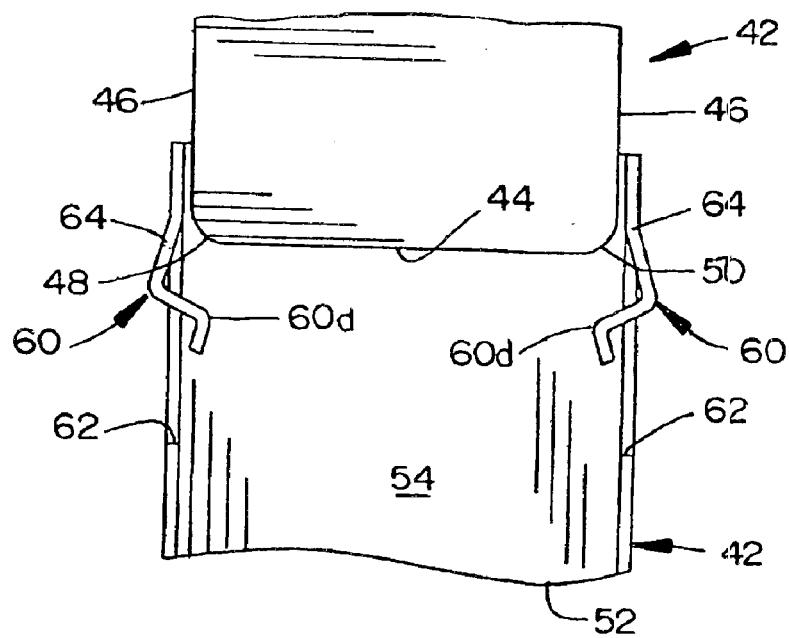

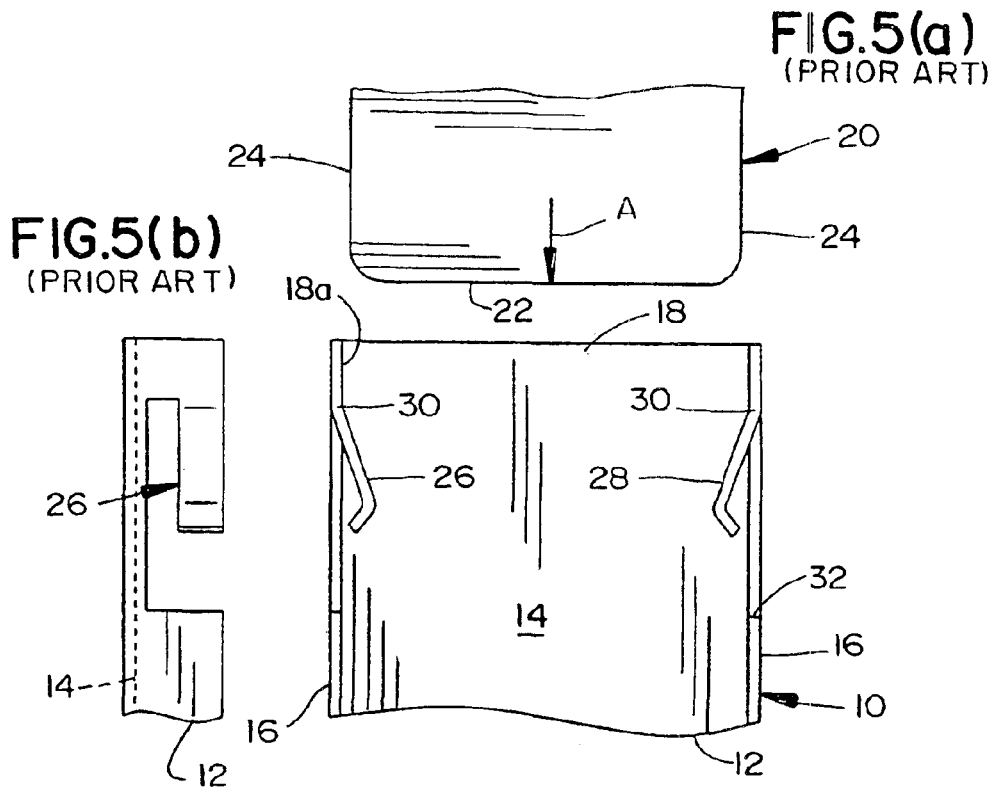
FIG.5(a) (PRIOR ART)
FIG.5(b) (PRIOR ART)
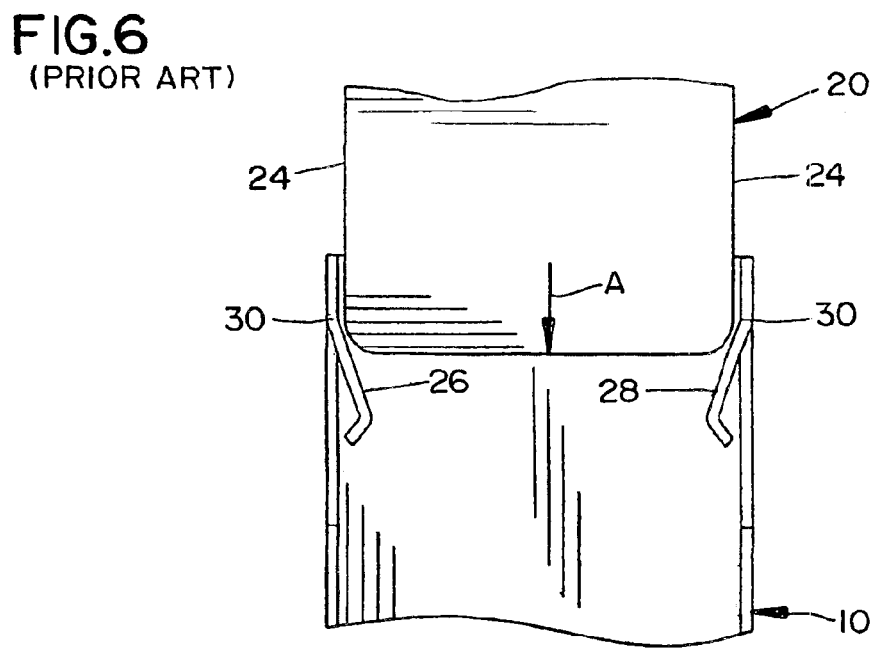
FIG.6 (PRIOR ART)

SHIELDED CARD CONNECTOR WITH IMPROVED CONTACTS

FIELD OF THE INVENTION

This invention generally relates to the art of electrical connectors and, particularly, to a card connector for connecting an integrated circuit card, such as a memory, PC, or multi media card, to another electronic device, and, in particular, to a shielded card connector provided with improved contacts for engaging the other electronic device.

BACKGROUND OF THE INVENTION

IC cards have been developed and contain IC's (integrated circuits) including memory circuits, such as rams (random access memories), and control circuits, such as CPUs (central processing units). A special type of IC card, called a multi media card (or "MMC") is of increasing interest and is used in small electronic devices such as videocameras, smartphones, music players and the like. Multi media cards normally include a terminal array for connection through a card reader system to the external equipment. The connector usually includes some form of IC card socket and a plurality of electrodes or contacts exposed in the socket for engaging the terminal array of the IC card. The card is inserted into and removed from the socket, and the connector contacts are resilient or comprise springy contacts for yieldably engaging the terminal array of the card when the card is inserted into the socket.

With the ever-increasing miniaturization of IC cards and their respective connectors, various problems continue to arise. For instance, the very handling of the miniature IC cards is difficult, and proper positioning of the cards in the connector presents corresponding problems when the card is inserted into and removed from the card-receiving cavity or other receptacle means of the connector. It often is very difficult to grip, insert and remove the IC card from the connector. In addition, such IC card connectors often are shielded or surrounded by a metal shell. In fact, the metal shell may even form the cavity or receptacle means for the IC card. The metal shell often has contacts which are engageable by conductive components, such as shields, on the inserted IC card.

FIGS. 5–8 show an example of such a prior art IC card connector, generally designated 10, which includes a sheet metal shell 12 having a side wall 14 and opposite end walls 16 defining a hollow interior or slot 18 into which an IC card, generally designated 20, is inserted in the direction of arrow "A". The IC card includes a leading or insertion edge 22 and a pair of side edges 24.

Metal shell 12 includes a pair of spring contacts 26 and 28 which are bent angularly inwardly from side walls 16, as at bending points 30. The contacts are stamped and formed out of openings 32 in the side walls of the metal shell so that the spring contacts are angled inwardly into the hollow interior or slot 18 of the metal shell.

Spring contacts 26/28 typically are electrostatic discharge (ESD) contacts and, consequently, preferably are located as close to the mouth 18a of slot 18 as possible so that the conductive shield of card 20 engages the contacts early in the insertion process of the IC card. FIGS. 6 and 7 shows IC card 20 inserted into the metal shell in the direction of arrow "A" in a very straight path and into initial engagement with spring contacts 26 and 28. If, in every cycle of operation including an insertion and removal process of IC card 20 into and out of slot 18, the IC card would be inserted and removed in a straight and precise linear path as indicated by arrows "A", few problems would be encountered. However, FIG. 8 shows a more common scenario wherein IC card 20 is inserted into the metal shell at an angle as indicated by arrow "B". It can be seen that the one corner 34 of the IC card has engaged spring contact 26 and not only has bent the spring contact outwardly in the direction of arrow "C", but the spring contact actually is bent completely outwardly through the opening 32 in side wall 16 of the metal shell. The result is that the metal spring contact can be deformed and its reliability considerably diminished.

SUMMARY OF THE INVENTION

An object, therefore, of the invention is to provide a new and improved shielded card connector of the character described.

In the exemplary embodiment of the invention, the card connector is adapted for receiving an integrated circuit card. A connector housing includes a metal shell having a slot for receiving the card and a side wall defining at least a portion of the slot. An L-shaped spring contact protrudes from the side wall into the slot for engaging an appropriate conductive portion of the integrated circuit card when inserted into the slot. The spring contact includes a proximal bent portion extending angularly from the side wall outwardly beyond the slot. A distal bent portion extends angularly from the proximal bent portion back into the slot for engaging the conductive portion of the inserted circuit card.

As disclosed herein, the shell is stamped and formed of thin metal plate material, and the spring contact is an integral spring finger portion of the shell. A pair of the spring contacts preferably are disposed at a pair of side walls of the shell defining opposite edges of the slot. Each spring contact includes an outwardly flared tip portion at a distal end of the distal bent portion.

Other objects, features and advantages of the invention will be apparent from the following detailed description taken in connection with the accompanying drawings.

BRIEF DESCRIPTION OF THE ACCOMPANYING DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIGS. 1(a) and (b) show a card connector embodying the concepts of the invention in conjunction with an IC card about to be inserted into the connector.

FIG. 2 is a view similar to that of FIG. 1(a), with the IC card inserted into the connector in the direction of arrow "D";

FIGS. 5–8 show the shielded IC card connector of the prior art described in the "Background", above.

Figure 3:
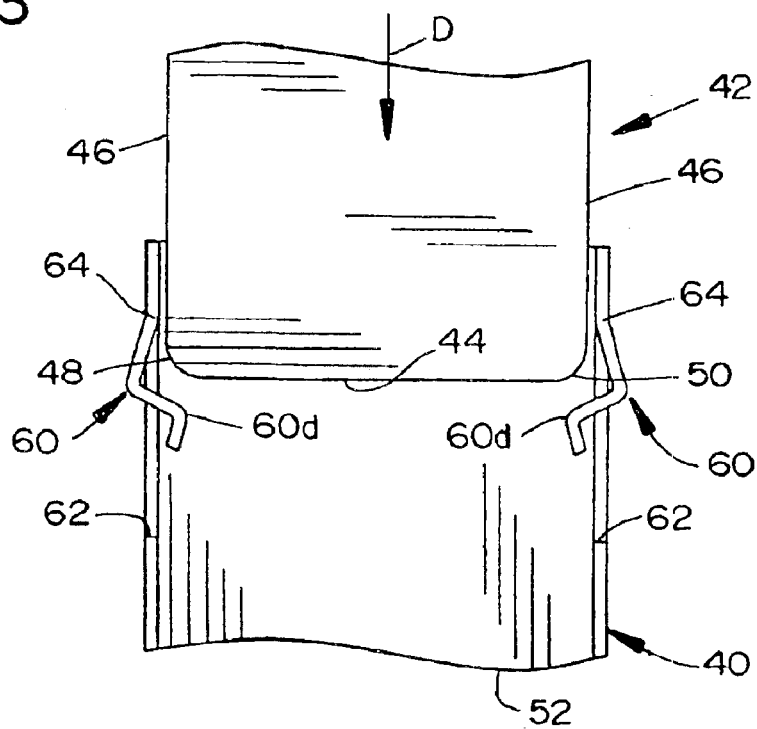
FIG. 3 is a view similar to that of FIG. 2, with the IC card further inserted into the connector in the direction of arrow "D"

DESCRIPTION OF THE PREFERRED EMBODIMENTS:

Referring to the drawings in greater detail, and first to FIG. 1, the invention is embodied in a female-type connector, generally designated 40, for receiving a male-type connector, generally designated 42, inserted into the female connector in the direction of arrow "D". In the preferred embodiment, female connector 40 is an IC card connector designed for receiving an IC card 42. The IC card includes a leading edge 44 and a pair of side edges 46 joined to the leading edge at front corners 48 and 50.

IC card connector 40 includes some form of housing for receiving the card, and the housing may be formed by a stamped and formed sheet metal shell 52 having a bottom wall 54 and a pair of side walls 56 defining a receiving slot 58 for receiving IC card 42 in the direction of arrow "D". A pair of L-shaped spring contacts, generally designated 60, are stamped and formed out of openings 62 in side walls 56 of the metal shell for engaging appropriate sides 46 of IC card 42, presuming that the card is covered by a conductive shield.

Each L-shaped spring contact 60 includes a proximal bent portion 60*a* extending angularly from a respective side wall 56 of the shell, outwardly beyond slot 58. The proximal bent portion is bent outwardly from the side wall at a point 64 where the spring contact is integral with the side wall. A distal bent portion 60*b* extends angularly from the proximal bent portion back into slot 58 for engaging the conductive portion of the inserted circuit card 42. Distal bent portion 62*b* joins proximal bent portion 60*a* at an elbow 60*c*. Finally, each spring contact 60 includes an outwardly flared tip portion 60*d* at the distal end of each distal bent portion 60*b*.

Figure 4:
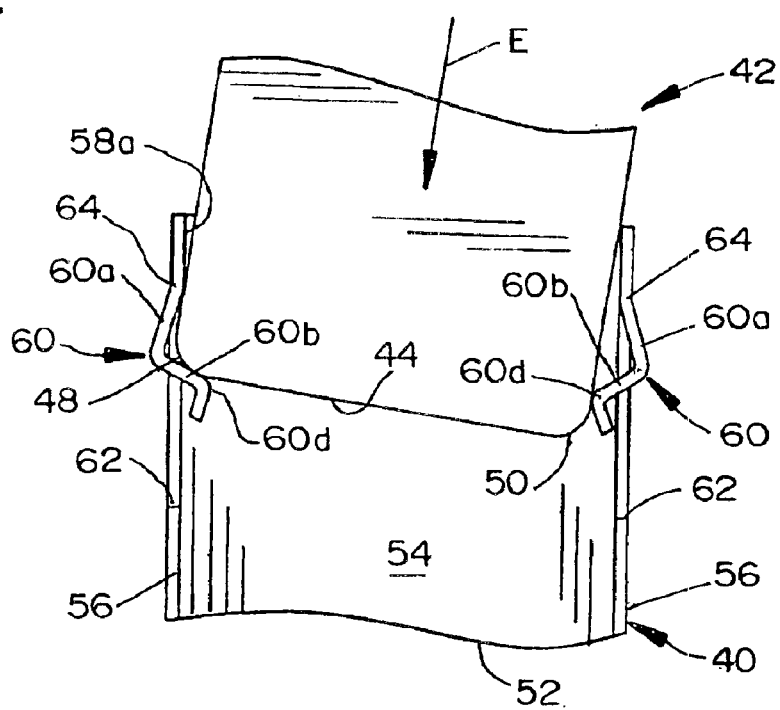
FIG. 4 is a view similar to that of FIG. 3, but with the IC card having been tilted during its insertion into the connector.
Figure 7:
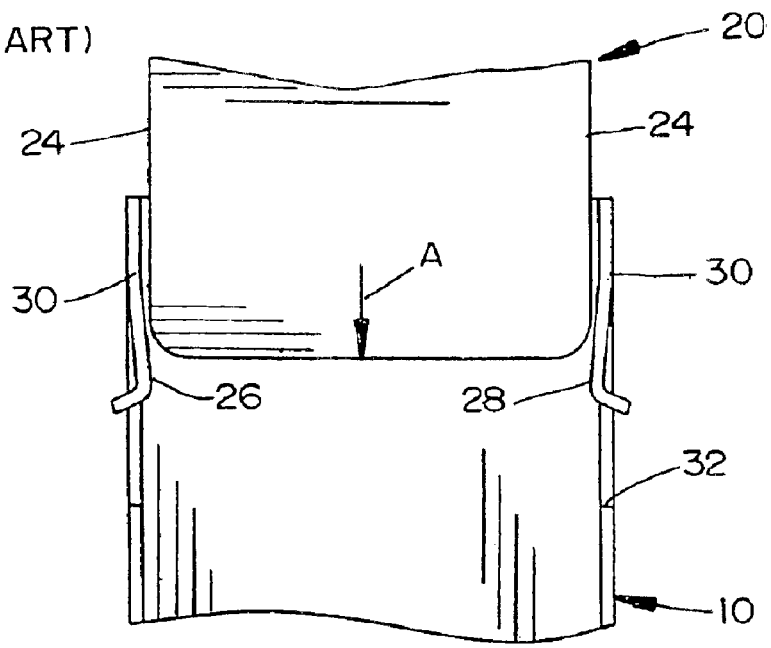
Figure 8:
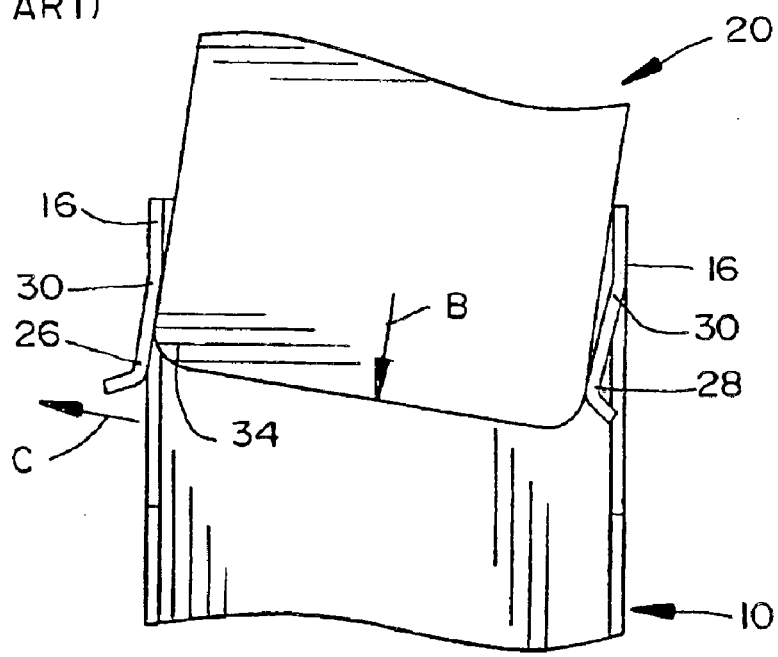

From the foregoing, it can be seen that each spring contact 60 first is bent outwardly of the metal shell (actually outwardly from slot 58 through opening 62) and then back inwardly into the slot for engaging the side edges of the IC card. The result of this unique configuration of spring contacts 60 is shown in FIGS. 2–4. Specifically, as long as IC card 42 is inserted in a straight line into card connector 40 in the direction of arrows "D", front corners 48 and 50 of the IC card will simultaneously engage spring contacts 60 and bias the spring contacts outwardly in opposite directions so that outwardly flared tip portions 60*d* of the spring contacts eventually engage the conductive side edges 46 of the IC card. This straight and proper insertion of the card is shown in FIGS. 2 and 3. However, if the IC card is skewed and is attempted to be inserted into the card connector at an angle as indicated by arrow "E" (FIG. 4), front corner 48 of the IC card simply enters into the elbow between proximal bent portion 60*a* and distal bent portion 60*b* of the left-hand spring contact 60 as viewed in FIG. 4. In fact, it can be seen that front corner 48 of the IC card actually moves slightly into opening 62 in side wall 56 of the metal shell. The result is that the spring contacts do not become overstressed or overbent and do not lose their permanent elasticity because IC cards may be repeatedly inserted into and removed from the IC card connector in all kinds of skewed orientations.

As the IC card continues to be inserted into the connector from the position shown in FIG. 4, the dimensions of slot 58 and the length of the IC card inwardly from mouth 58*a* of the slot results in the IC card straightening itself up of its own accord after little or no damage has occurred to the spring contacts due to the initial skewed insertion of the card.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A card connector (40) for receiving an integrated circuit card (42), comprising:

a connector housing including a metal shell (52) having a slot (58) for receiving the card, a side wall (56) of the shell defining at least a portion of the slot, and an L-shaped spring contact (60) protruding from said side wall (56) into the slot (58) for engaging an appropriate conductive portion of the integrated circuit card when inserted into the slot, the spring contact (60) including a proximal bent portion (60*a*) extending angularly from said side wall outwardly beyond the slot, and a distal bent portion (60*b*) extending angularly from the proximal bent portion back into the slot for engaging the conductive portion of the inserted circuit card.

2. The card connector of claim 1, wherein said shell (52) is stamped and formed of thin metal plate material, and said spring contact comprises an integral spring finger portion (60) of the shell.

3. The card connector of claim 1, including a pair of said spring contacts (60) at a pair of side walls (56) of the shell (52) defining opposite edges of the slot (58).

4. The card connector of claim 1, wherein said spring contact (60) includes an outwardly flared tip portion (60*d*) at a distal end of said distal bent portion (60*b*).

5. A shielded connector assembly, comprising:

a female-type connector (40) including a metal shell (52) having a receptacle (58) for receiving a male-type connector (42), a side wall (56) of the shell defining a portion of the receptacle, and a spring contact (60) protruding from said side wall (56) into the receptacle for engaging an appropriate conductive portion of the male-type connector (42) when inserted into the slot, the spring contact (60) including a proximal bent portion (60*a*) extending angularly from said side wall outwardly beyond the receptacle, and a distal bent portion (60*b*) extending angularly from the proximal bent portion back into the receptacle for engaging the conductive portion of the inserted male-type connector.

6. The shielded connector assembly of claim 5, wherein said shell (52) is stamped and formed of thin metal plate material, and said spring contact comprises an integral spring finger portion (60) of the shell.

7. The shielded connector assembly of claim 5, including a pair of said spring contacts (60) at a pair of side walls (56) of the shell (52) defining opposite edges of the receptacle (58).

8. The shielded connector assembly of claim 5 wherein said spring contact (60) includes an outwardly flared tip portion (60*d*) at a distal end of said distal bent portion (60*b*).

* * * * *